United States Patent [19]

Caldwell

[11] Patent Number: 4,846,105
[45] Date of Patent: Jul. 11, 1989

[54] DISPOSABLE LITTER TRAY

[76] Inventor: Thomas F. Caldwell, 4931 Welsh Rd., Rockford, Ill. 61107

[21] Appl. No.: 54,829

[22] Filed: May 27, 1987

[51] Int. Cl.⁴ .............................................. A01K 67/00
[52] U.S. Cl. ........................................................ 119/1
[58] Field of Search ................ 119/1; 229/23 BT, 101, 229/103, 123

[56] References Cited

U.S. PATENT DOCUMENTS

| | | | |
|---|---|---|---|
| 1,666,294 | 4/1928 | Downes-Martin | 229/101 X |
| 2,810,506 | 10/1957 | Kessler | 229/101 X |
| 3,062,428 | 11/1962 | DeHinger | 229/123 X |
| 3,886,901 | 6/1975 | Zeitter | 119/1 |
| 3,990,396 | 11/1976 | Turk | 119/1 |
| 3,990,397 | 11/1976 | Lowe, Jr. | 119/1 |

FOREIGN PATENT DOCUMENTS 8604777 8/1986 Fed. Rep. of Germany .......... 119/1

Primary Examiner—Robert Peshock
Assistant Examiner—R. Thomas Price
Attorney, Agent, or Firm—Leydig, Voit & Mayer, Ltd.

[57] ABSTRACT

Cat litter is packaged and sold in a rectangular carton made of cardboard and having two opposing end flaps and two opposing side flaps. When opened, the flaps form upright side walls and enable the carton to be used as a litter tray. A reusable pastic collar is adapted to slip over the flaps to hold the flaps open and to rigidify the carton during use.

3 Claims, 3 Drawing Sheets

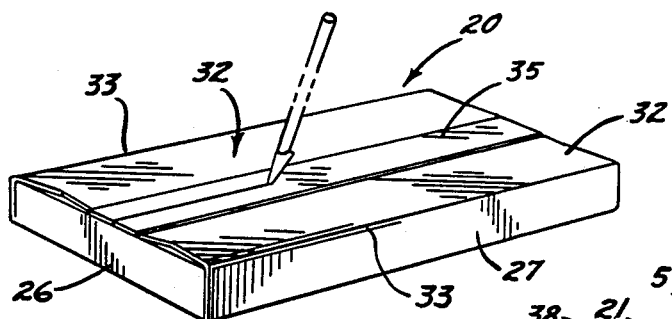
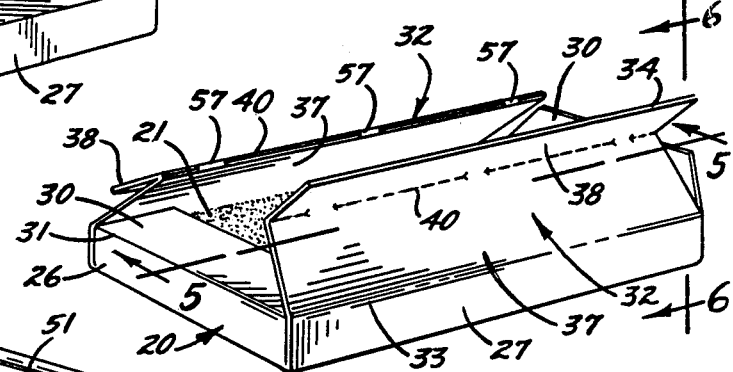
Fig. 1.
Fig. 2.
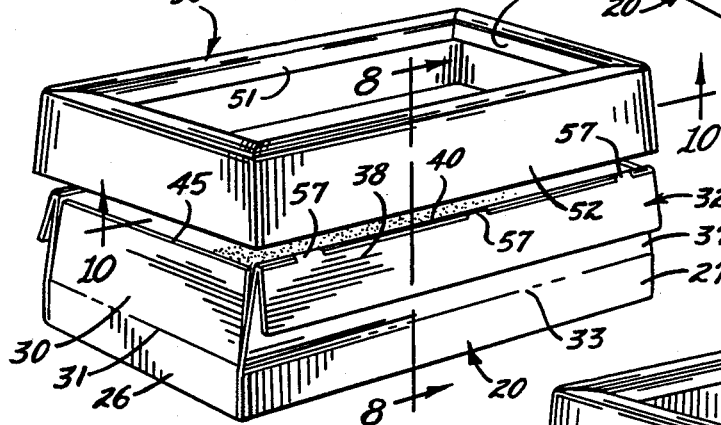
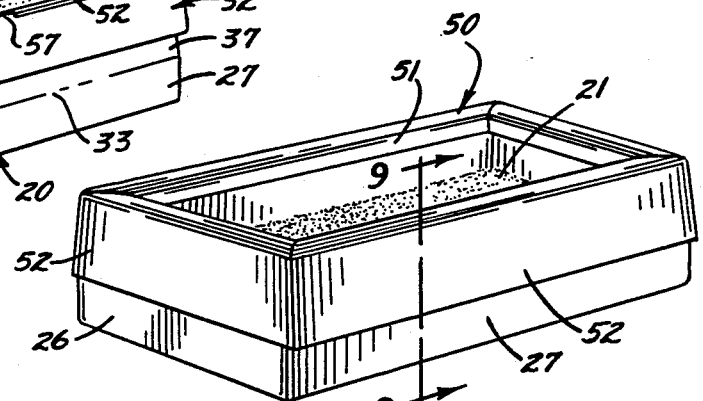
Fig. 3.
Fig. 4.
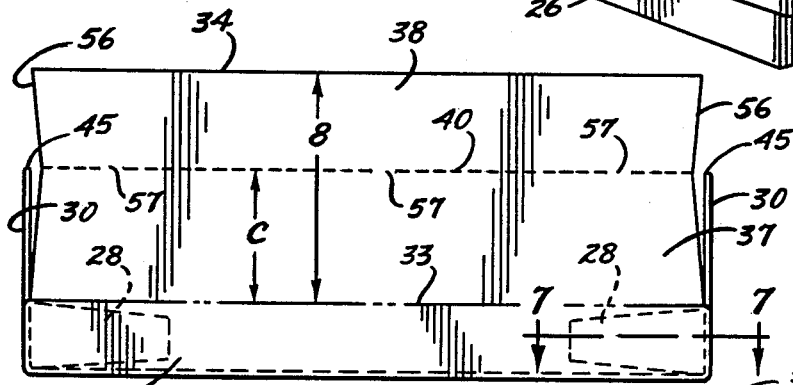
Fig. 5.
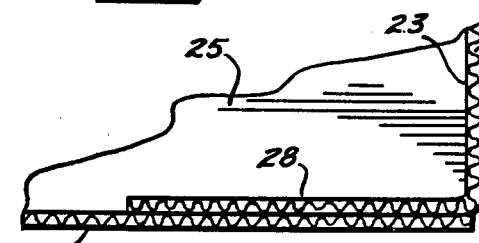
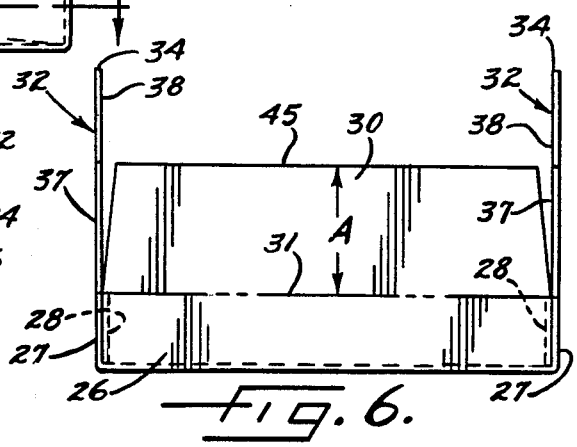
Fig. 7.
Fig. 6.

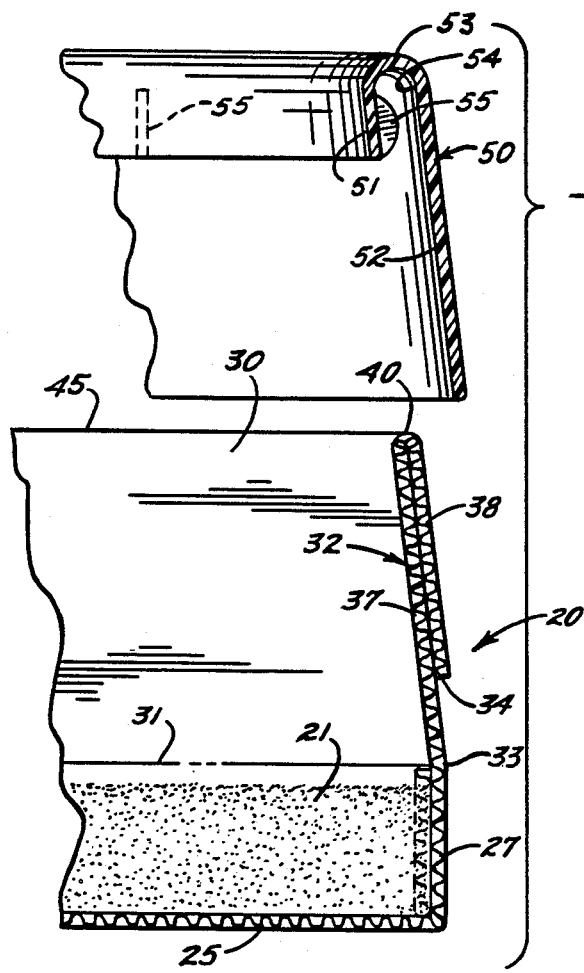
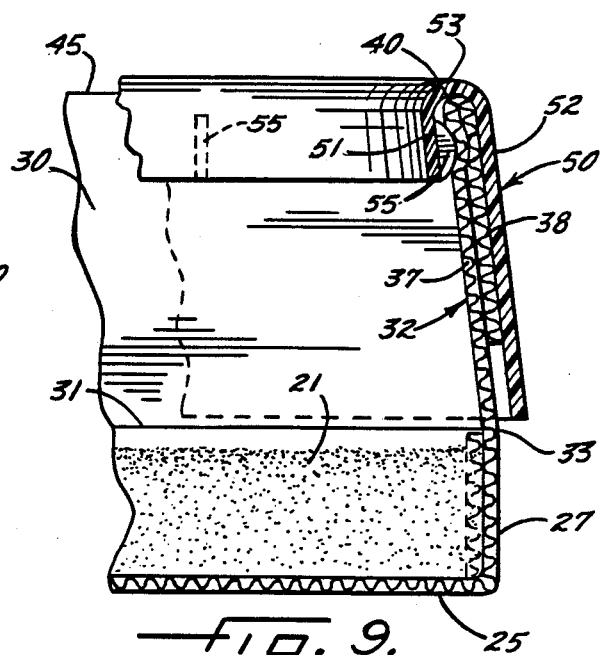
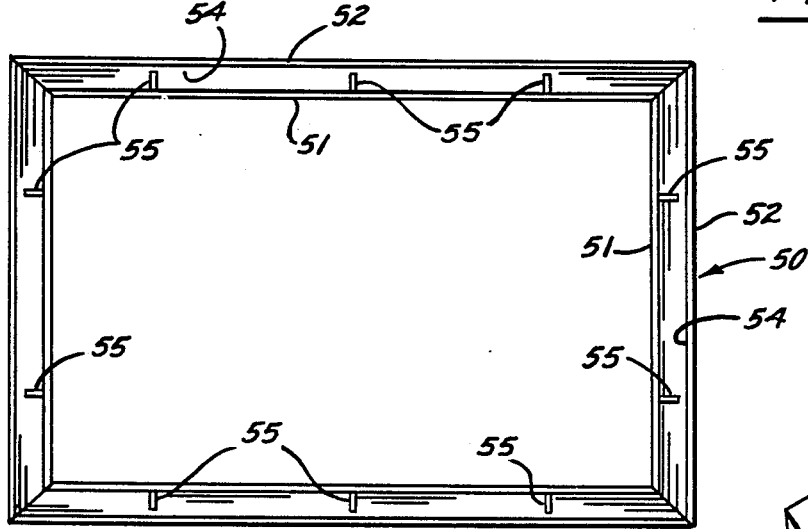
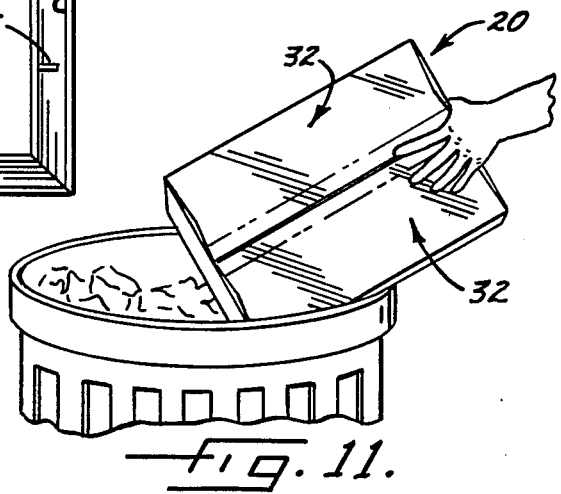

DISPOSABLE LITTER TRAY

BACKGROUND OF THE INVENTION

This invention is concerned generally with cat litter and with litter trays or boxes for use therewith.

Cat litter is most conventionally sold in bags of various sizes and is used with a litter box made of relatively rigid plastic. Dumping the used litter and cleaning the litter box for reuse is a messy and unpleasant chore. Even if a disposable plastic liner is used with the litter box, some time is required to gather up the old liner, to put a new liner in the box and to fill the box with new litter. Moreover, if the cat claws through the liner, litter may pour from the liner when the liner is picked up from the box and thus cleaning of the box may be required.

In some cases, litter is sold in a carton which itself forms a disposable litter box. Such cartons, however, usually require a removable top and do not form a box of any significant depth.

SUMMARY OF THE INVENTION

The general aim of the present invention is to provide a new and improved one-piece carton in which litter is originally packaged, shipped and sold and which, upon being opened, may itself serve as a litter box adapted for quick and easy reclosure and disposal.

A more detailed object of the invention is to provide a novel carton having flaps adapted to be opened and held in upright positions so as to form walls of a height approximating the height of the walls of a conventional litter box.

An important object of the invention is to provide a reusable collar adapted to hold the walls of the carton in upright positions, adapted to rigidify the carton during use and adapted to help retain litter in the carton when the cat scratches in the litter.

These and other objects and advantages of the invention will become more apparent from the following detailed description when taken in conjunction with the accompanying drawings.

BRIEF DESCRIPTION OF THE DRAWINGS

FIG. 1 is a perspective view of one embodiment of a new and improved cat litter carton incorporating the unique features of the present invention and schematically shows the first step of opening the carton.

FIG. 2 is a perspective view showing the first step involved in converting the carton for use as a litter box.

FIG. 3 is an exploded perspective view showing the plastic collar being assembled with the carton.

FIG. 4 is a perspective view showing the collar fully assembled with the carton.

FIG. 5 is an enlarged side elevational view of the partially converted carton as seen substantially along the line 5—5 of FIG. 2.

FIG. 6 is an enlarged end elevational view of the partially converted carton as seen substantially along the line 6—6 of FIG. 2.

FIG. 7 is an enlarged fragmentary cross-section taken substantially along the line 7—7 of FIG. 5.

FIG. 8 is an enlarged fragmentary cross-section taken substantially along the line 8—8 of FIG. 3.

FIG. 9 is an enlarged fragmentary cross-section taken substantially along the line 9—9 of FIG. 4.

FIG. 10 is a bottom plan view of the collar as seen substantially along the line 10—10 of FIG. 3.

FIG. 11 is a perspective view schematically showing disposal of the carton.

DETAILED DESCRIPTION OF THE PREFERRED EMBODIMENTS

Figure 12:
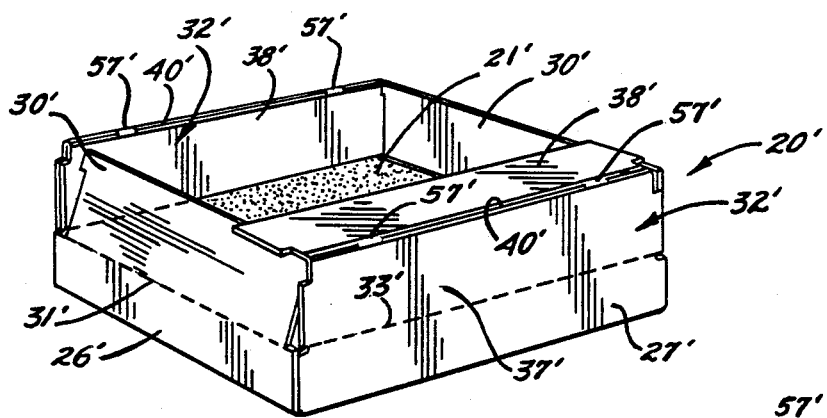
FIG. 12 is a perspective view of another embodiment of a carton incorporating the features of the invention and shows the carton partially converted for use as a litter box.

The present invention contemplates the provision of a unique one-piece carton 20 which initially serves as the original shipping and sales package for a quantity of cat litter 21. After being purchased, the carton may be opened and converted for use as a litter tray or box. When the litter becomes dirty, the carton simply is reclosed and is thrown away.

More specifically, the carton 20 is made from a single piece of conventional corrugated paperboard formed by a corrugated medium 22 (FIG. 7) sandwiched between inner and outer paper liners 23 and 24. To prevent moisture from seeping through the carton, the inner liner 23 may be coated with a very thin plastic-like coating.

The carton 20 comprises a flat rectangular bottom wall 25 (FIG. 8) having a longitudinal dimension or length of about 18 inches and having a transverse dimension or width of about 12 inches. A pair of opposing vertical end walls 26 and a pair of longer vertical side walls 27 are formed integrally with and extend upwardly from the bottom wall. Tabs 28 (FIG. 7) are formed integrally with the end walls 26 and are glued to the inner sides of the side walls 27 adjacent the ends thereof so as to join the end walls and the side walls together at the four corners of the carton. The end walls and the side walls have a height of about 1½ inches.

End flaps 30 are hinged to the upper margins of the end walls 26 and are adapted to fold about transversely extending score lines 31 between generally horizontal closed positions and upright open positions. The score lines 31 are formed by die crushing the corrugated medium 22 and the inner liner 23 of the paperboard material and thus the memory of the material tends to cause the end flaps 30 to swing upwardly toward their open positions. The dimension A (FIG. 6) or height of each end flap is about 3½ inches.

In a like manner, side flaps 32 are hinged to the upper margins of the side walls 27 along longitudinally extending score lines 33 which are die crushed into the corrugated medium 22 and the inner liner 23 of the paperboard so that the side flaps tend to be biased upwardly toward upright open positions. The overall dimension B (FIG. 5) of each side flap 32 is just slightly less than 6 inches and thus the longitudinally extending edges 34 of the two side flaps nearly abut one another when the side flaps are folded about the score lines 33 to closed horizontally extending positions shown in FIG. 1.

The carton 20 is prefilled with litter 21 and serves as the original shipping and sales package for the litter. While the flaps 30 and 32 are in open positions, the carton is filled with an appropriate quantity (e.g., five lbs.) of litter at the packing plant. The end flaps are then are closed and the side flaps 32 are closed downwardly over the end flaps. An elongated strip of tape 35 (FIG. 1) then is adhesively applied along the adjacent longitudinally extending edge portions of the side flaps 32 so as to seal the joint between the edges 34 of the side flaps and to hold all four of the flaps in their closed positions.

In keeping with the invention, the carton 20 itself is adapted to be converted for use as a litter box or tray. For this purpose, each of the side flaps 32 of the carton is defined by two flap sections and 37 and 38. The first section 37 of each side flap 32 is hinged to the respective side wall 27 at the score line 33 and has a dimension C (FIG. 5) of 3½ inches, that dimension being the same as the dimension A of the end flaps 30. The second section 38 of each side flap 32 is hinged to the first section 37 by a deep, longitudinally extending score line 40 located at the junction of the first and second sections. Each score line 40 is a cut score formed by cutting through the corrugated medium 22 and the inner., liner 23 of the paperboard material. When each side flap 32 is open, the second flap section 38 tends to fold downwardly along the outer side of the first flap section 37.

To use the carton 20 as a litter box, the sealing tape 35 is slit longitudinally with a knife along the narrow gap between adjacent edges 34 of the side flaps 32 as shown in FIG. 1. Thereafter all of the flaps 30 and 32 are opened and the second flap sections 38 are folded downwardly along the outer sides of the first flap sections 37 (see FIGS. 2 and 3). With the flaps in this position, the upper margins of the flap sections 37 as defined by the score lines 40 are at the same elevation as the upper edges 45 of the end flaps 30. The four flaps are held in open and substantially vertical positions and, when so held, coact with the end walls 26 and the side walls 27 of the carton to cause the overall litter box to have walls with a height of about 5 inches.

Various means may be used to hold the flaps 30 and 32 in their open and upright positions. For example, one or more elastic bands may be placed around the four flaps to draw the end portions of one pair of opposing flaps into abutting engagement with the end edges of the other two flaps. Alternatively, suitable clips may be used to secure adjacent flaps to one another at the corners of the carton 20 after the flaps have been opened. It is preferred, however, to hold the flaps together with a unique collar 50 of the type shown in FIGS. 3 and 4 and FIGS. 8 to 10.

The collar 50 preferably is made of a rigid plastic and has approximately the same rectangular dimensions as the bottom wall 25 of the carton 20. The collar includes inner and outer side walls 51 and 52 (FIGS. 8 to 10) whose upper margins are integrally joined by a gradually rounded bridge 53. Thus, the collar defines a channel 54 of inverted U-shaped cross-section for receiving the flaps 30 and 32.

In use, the collar 50 is slipped over the flaps 30 and 32 after the latter have been opened and after the second flap sections 38 have been,,folded downwardly alongside the outer sides of the first flap sections 37. The collar not only holds the flaps open but also rigidifies the carton 20 and eliminates the danger of the cat folding the flaps or otherwise disturbing the position of the flaps as the cat enters and leaves the box. To help prevent litter from flying out of the box when the cat scratches, the side walls 51 and 52 slant outwardly as they progress downwardly and thereby cause the flaps to converge as the flaps progress upwardly. The converging flaps tend to form baffles preventing litter from flying upwardly out of the carton. To help hold the collar securely on the carton, ribs 55 (FIGS. 8 to 10) are formed integrally with and are spaced along the inner side wall 51 of the collar. The ribs project into the channel 54 and press against the inner sides of the flaps 30 and 32 in order to provide a frictional fit between the collar and the flaps.

When the litter 21 becomes dirty, the collar 50 is removed, the flaps 30 and 32 are reclosed and the entire carton 20 is simply thrown away (see FIG. 11). The flaps may be held closed with a piece of adhesive tape or by one or more elastic bands.

In order to accommodate the outward slant of the side walls 51 and 52 of the collar 50, the end edges 56 (FIG. 5) at each end of each side flap 32 are shaped to define a V whose apex is located at the score line 40. As a result, the side flaps may be swung inwardly between the end flaps 30 in order to enable all of the flaps to converge in accordance with the slant of the side walls 51 and 52.

When the carton 20 is closed, the second flap sections 38 of the side flaps 32 tend to spring upwardly about the score lines 40 and tend to swing upwardly from the end flaps 30. To prevent such upward swinging and to help hold the second flap sections 38 flat against the flaps 30, the score lines 40 are not continuous but instead are interrupted by three longitudinally spaced webs 57 (FIG. 3). As a result of the webs, the tendency of the second flap sections 38 to bow toward open positions is reduced but such sections still may be easily folded downwardly along the outer sides of the first flap sections 37.

From the foregoing, it will be apparent that the present invention brings to the art a new and improved one-piece carton 20 which not only serves as the original package for the litter 21 but which also serves as a disposable litter box or tray approximating the size and shape of conventional litter boxes. Virtually no mess is in in using and disposing of the carton. Because the first flap sections 37 are folded downwardly along the outer sides of the second flap sections 38, the top sides of the first flap sections 37 are clean when the flaps are reclosed.

Another embodiment of a litter tray 20' incorporating the features of the invention is shown in FIGS. 12 to 15 in which parts corresponding to those of the first embodiment are indicated by the same but primed reference numerals. The tray 20' is particularly characterized by its relatively small size and low cost making the tray useful for travel purposes or for use with cats in cages at cat shows.

Basically, the tray 20' is similar to the tray 20 in that the tray 20' includes a rectangular bottom wall 25', end walls 26', side walls 27', end flaps 30' foldable about score lines 31' and side flaps 32' foldable about score lines 33'. Each side flap 32' includes a first flap section 37' foldable about the score line 33' and further includes a second flap section 38' foldable about a cut score line 40' at the upper margin of the first flap section 37'. The closed carton 20' is about 10 inches wide, 12 inches long and 1½ inches deep and thus is significantly smaller than the carton 20.

Moreover, each cut score line 40' of each flap 32' is formed on the upper or outer surface of the flap. As a result, each second flap section 38' folds downwardly along the inner side of the first flap section 37' rather than along the outer side thereof (see FIGS. 12 and 13).

Because the second flap sections 38' are located inside of the carton 20 when the carton is converted to a tray, the outer side of the carton may be printed or decorated for purposes of presenting a decorative appearance at a cat, show and the unprinted lower or inner sides of the first flap sections 37' will not be visible.

Figure 13:
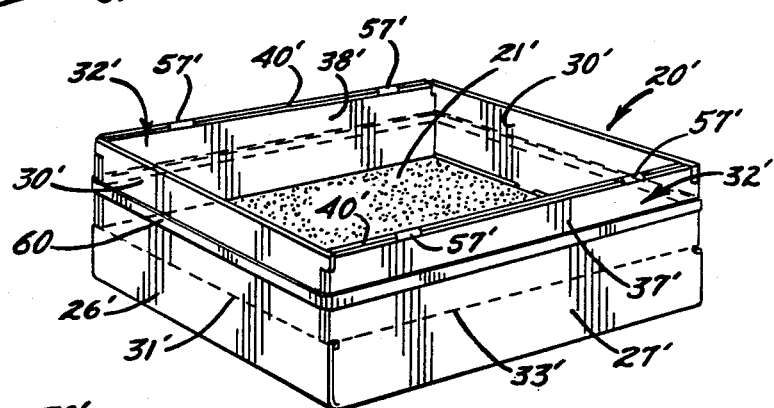
FIG. 13 is a perspective view similar to FIG. 12 but shows the carton fully converted for use as a litter box.
Figure 14:
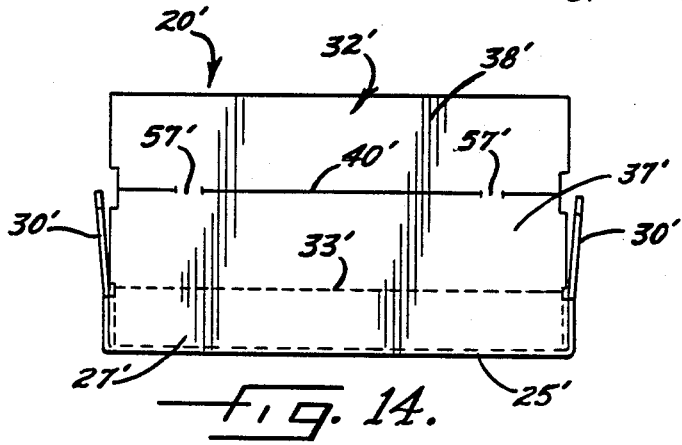
FIG. 14 is a side elevational view of the partially converted carton shown in FIG. 12.
Figure 15:
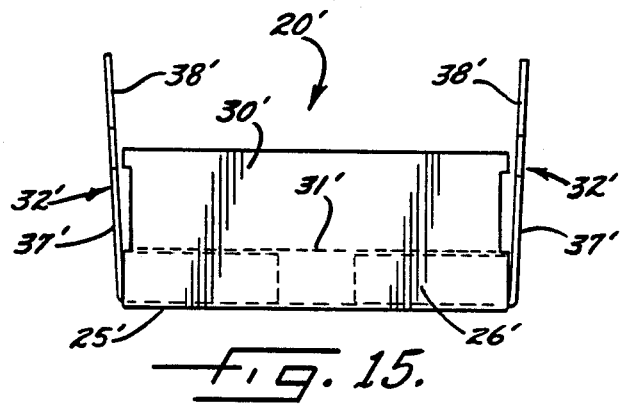
FIG. 15 is an end elevational view of the partially converted carton shown in FIG. 12.

As shown most clearly in FIGS. 13 to 15, the ends of the flaps 30' and 32' are formed with various notches and tabs which interfit with one another when the flaps are located in the fully converted position of FIG. 13. An elastic band 60 is placed around the flaps and urges the tabs against the bottoms of the notches so as to hold the flaps in upright positions during use. After the litter has been used, the flaps are retained in closed positions by the elastic band and then the carton 20' is simply thrown away.

I claim:

1. A cat litter tray comprising, in combination, a generally rectangular carton having a longitudinal dimension which is greater than the transverse dimension of the carton, said carton being made from a single piece of paperboard and having a flat bottom wall, two opposing end walls and two longer and opposing side walls upstanding from said bottom wall, said end walls and said side walls being of the same height and being secured together at the corners of said carton, end flaps hinged to the upper margins of said end walls to fold along transversely extending score lines between upright open positions and horizontal closed positions, said end flaps having upper edges located at a predetermined elevation when said end flaps are in said upright positions, side flaps hinged to the upper margins of said side walls to fold along longitudinally extending score lines between upright open positions and horizontal closed positions, said side flaps having longitudinally extending edges which are located closely adjacent one another when said side flaps are in said closed positions, each side flap comprising a first section hinged to the associated side wall and having an upper margin which, when said side flap is in said open position, is located at approximately the same elevation as the upper edges of said end flaps, each side flap having a second section hinged to the upper margin of said first section along a longitudinally extending score line which is located so as to permit the second section to fold downwardly alongside said first section when said side flap is in said position, a generally rectangular collar fitting releasably over said flaps when the carton is open, said collar having approximately the same longitudinal and transverse dimensions as said carton, said collar comprising a relatively rigid plastic member having spaced inboard and outboard upright walls connected integrally to one another at their upper margins and defining an inverted U-shaped channel for receiving the upper margins of said end flaps, the upper margins of the first sections of said side flaps and the adjacent margins of the second sections of said side flaps, said collar being effective to hold said end flaps and the first sections of said side flaps in said open positions and being effective to keep the second sections of said side flaps folded downwardly alongside the first sections of said side flaps.

2. A cat litter tray comprising, in combination, a carton made of paperboard and having a bottom wall of rectangular shape, four vertical walls upstanding from said bottom wall, flaps hinged to said vertical walls to fold between horizontal closed positions and upright open positions, two of said flaps being disposed in opposing relation to one another and each comprising a first section hinged to the upper margin of the associated vertical wall and further comprising a second section hinged to the first section to fold downwardly along the outerside of the first section, said flaps having upper margins which are all located at the same elevation when said flaps are in said upright positions, and a collar fitting releasbly over said flaps when the carton is open, said collar having the same general rectangular shape as the bottom wall of said carton and comprising a relatively rigid and plastic member having spaced inboard and outboard upright walls connected together at their upper margins and defining a channel for receiving the upper margins of said flaps, said collar being effective to hold said flaps in said upright positions.

3. A cat litter tray as defined in claim 2 further including ribs formed integrally with and spaced along the inboard walls of said member and projecting into said channel into pressing engagement with said flaps to help retain said collar on said flaps.

* * * * *